United States Patent
Husemann et al.

(10) Patent No.: US 7,271,203 B2
(45) Date of Patent: Sep. 18, 2007

(54) CROSSLINKING OF PHOTOINIATOR-INITIALIZED POLYACRYLATES

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 172 days.

(21) Appl. No.: 10/496,325

(22) PCT Filed: Nov. 22, 2002

(86) PCT No.: PCT/EP02/13173

§ 371 (c)(1),
(2), (4) Date: May 21, 2004

(87) PCT Pub. No.: WO03/046030

PCT Pub. Date: Jun. 5, 2003

(65) Prior Publication Data

US 2005/0020714 A1    Jan. 27, 2005

(30) Foreign Application Priority Data

Nov. 24, 2001 (DE) .............................. 101 57 695
Jan. 8, 2002 (DE) .............................. 102 00 363

(51) Int. Cl.
*C08F 2/46* (2006.01)
*C08F 293/00* (2006.01)
*C08J 3/28* (2006.01)

(52) U.S. Cl. ............... 522/153; 522/150; 522/162; 522/165; 522/905; 522/904; 522/35; 522/178; 522/182; 522/113; 522/120; 522/121; 427/207.1; 427/208.4; 428/345; 428/349; 428/355 AC

(58) Field of Classification Search ............. 522/904, 522/905, 35, 165, 162, 113, 114, 120, 121, 522/178, 182, 150; 428/343, 349, 345, 355 R, 428/355 EN, 355 AC; 427/208, 208.4, 207.1
See application file for complete search history.

(56) References Cited

U.S. PATENT DOCUMENTS

| | | | |
|---|---|---|---|
| 4,565,769 A * | 1/1986 | Dueber et al. ............ 430/281.1 |
| 4,581,429 A | 4/1986 | Solomon et al. ............ 526/220 |
| 4,699,950 A | 10/1987 | Sato et al. ................. 525/185 |
| 4,758,626 A | 7/1988 | Ishihara et al. ............ 525/148 |
| 5,334,456 A | 8/1994 | Noren et al. ............... 428/431 |
| 5,510,443 A | 4/1996 | Shaffer et al. .............. 528/45 |
| 5,525,422 A * | 6/1996 | Spies et al. ........... 428/355 AC |
| 5,767,210 A | 6/1998 | Lecomte et al. .......... 526/317.1 |
| 5,773,485 A * | 6/1998 | Bennett et al. ............... 522/8 |
| 5,789,487 A | 8/1998 | Matyjaszewski et al. ... 525/301 |
| 5,811,500 A | 9/1998 | Dubois et al. ............. 526/145 |
| 5,854,364 A | 12/1998 | Senninger et al. ........ 526/192 |
| 5,888,644 A | 3/1999 | Yoshida et al. ........... 428/323 |
| 5,902,836 A * | 5/1999 | Bennett et al. ............... 522/8 |
| 5,919,871 A | 7/1999 | Nicol et al. ............. 525/333.8 |
| 5,945,491 A | 8/1999 | Matyjaszewski et al. ... 526/111 |
| 6,111,022 A | 8/2000 | Matyjaszewski et al. ... 525/238 |
| 6,114,482 A | 9/2000 | Senninger et al. ........ 526/172 |
| 6,143,848 A | 11/2000 | Lee et al. ................. 526/212 |
| 6,448,301 B1 * | 9/2002 | Gaddam et al. ............... 522/6 |
| 6,479,608 B1 | 11/2002 | Nesvadba et al. ......... 526/328.5 |
| 6,652,963 B2 | 11/2003 | Husemann et al. ......... 428/355 |
| 6,664,306 B2 * | 12/2003 | Gaddam et al. ............... 522/6 |
| 6,831,114 B2 * | 12/2004 | Husemann et al. .......... 522/35 |
| 2004/0049972 A1 | 3/2004 | Husemann et al. |

FOREIGN PATENT DOCUMENTS

| | | |
|---|---|---|
| DE | 27 43 979 | 4/1979 |
| DE | 199 49 352 A1 | 4/2000 |
| EP | 0 735 052 A2 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 1 270 699 | 1/2003 |
| WO | WO93/09152 | 5/1993 |
| WO | WO96/24620 | 8/1996 |
| WO | WO98/01478 | 1/1998 |
| WO | WO98/13392 | 4/1998 |
| WO | WO98/44008 | 10/1998 |
| WO | WO99/31144 | 12/1998 |
| WO | WO 02/10309 | 2/2002 |
| WO | WO 02/14378 | 2/2002 |

OTHER PUBLICATIONS

U.S. Appl. No. 10/333,983, filed Jan. 28, 2003, Husemann et al.

* cited by examiner

*Primary Examiner*—Sanza L. McClendon
(74) *Attorney, Agent, or Firm*—Norris McLaughlin & Marcus PA

(57) ABSTRACT

A process for increasing the molecular weight of polyacrylates, characterized in that polyacrylates which are functionalized at least on one part of their chain ends by photoinitiator groups X are exposed to actinic radiation, so that a direct linking reaction of the polyacrylates takes place.

12 Claims, No Drawings

CROSSLINKING OF PHOTOINIATOR-INITIALIZED POLYACRYLATES

This is a 371 of PCT/EP02/13173 filed 22 Nov. 2002 (international filing date).

The invention relates to a process for increasing the molecular weight of polyacrylates and derivatives thereof, in particular for crosslinking.

BACKGROUND OF THE INVENTION

Among producers of acrylic pressure sensitive adhesives (PSAs) there is a trend toward reducing the proportion of solvent in the production process. This relates in particular to the coating process, since here in general the polymers are coated from a solution with a concentration of 20 or 30% onto the corresponding carrier material and subsequently the solvent is distilled off again in drying tunnels. As a result of the heat introduced, the drying step may additionally be utilized for the thermal crosslinking of the PSA.

If it is then desired to reduce the solvent fraction or to eliminate it completely, polyacrylate PSAs can be coated from the melt. This is done at relatively high temperatures, since otherwise the flow viscosity would be too high and the adhesive would exhibit an extreme resilience during the coating operation. One example of a functioning commercial system is represented by the UV acResins™ from BASF AG. Here, a low flow viscosity at temperatures of less than 140° C. has been achieved by lowering the average molecular weight to below 300 000 g/mol. Accordingly, these materials are easy to coat from the melt. As a result of the lowering, however, there is also a deterioration in the technical adhesive properties, especially the cohesion, of these PSAs. In principle, the cohesion can be raised by UV or EB crosslinking. Nevertheless, the UV acResins™ do not achieve the level of cohesion attained by high molecular mass acrylic PSAs which have been applied conventionally from solution and crosslinked thermally.

A key problem is the network arc length, since acrylic hotmelt PSAs generally have a relatively low molecular weight, possess a relatively low fraction of interloops, and thus need to be crosslinked to a greater extent. Although the greater crosslinking does increase the level of cohesion, the distance between the individual crosslinks becomes smaller and smaller. Consequently, the network is significantly tighter and the PSA then possesses only a low level of viscoelastic properties.

Accordingly, there is a need for a polymer which is easy to coat from the melt and is subsequently crosslinked on the carrier material in film form in a specific way, so that, preferably, a linear polymer with only very few crosslinking sites is formed.

Endgroup-functionalized polymers have already been known for a long time. In U.S. Pat. No. 4,758,626, for example, polyesters were impact modified using carboxy-terminated polyacrylates. However, no description was given there of specific endgroup crosslinking.

U.S. Pat. No. 4,699,950 describes thiol-functionalized polymers and block copolymers. The polymers, however, contain only one functional group, which is subsequently used for polymerization or for other reaction.

U.S. Pat. No. 5,334,456 describes maleate- or fumarate-functionalized polyesters. Subsequent crosslinking takes place in the presence of vinyl ethers. Here again, polyacrylates are not described.

U.S. Pat. No. 5,888,644 describes a process for preparing release coating materials. Its starting point is formed by polyfunctional acrylates, which are reacted with polysiloxanes. Here again, no defined network is formed, so that this process cannot be transferred either to acrylic PSAs.

U.S. Pat. No. 6,111,022 describes poly(meth)acrylonitrile polymers prepared by ATRP. Terminally functionalized polymers can also be prepared by these processes. Advantageous processes for preparing purposively crosslinked PSAs are not disclosed, however.

In U.S. Pat. No. 6,143,848, terminally functionalized polymers are prepared by a new, controlled polymerization process. The polymerization process employed is an iodine transfer process. However, polymers of this type lack great thermal stability, since iodides generally react with air and are easily oxidized to iodine. Severe discolorations are a consequence of this. This applies in particular to hotmelt processes with high temperatures.

None of the aforementioned documents points to a process in which polyacrylates endgroup-functionalized with photoinitiators have been deliberately reacted therewith in order to construct a linear polymer chain or a polymer network.

It is an object of the invention to specify a process for building up the molecular weight of polyacrylates, in particular for their crosslinking, which has the disadvantages of the prior art only to a reduced extent, if at all.

Surprisingly, and unforeseeably for the skilled worker, this object is achieved by the process of the invention, as specified in the independent claim and in the subclaims.

SUMMARY OF THE INVENTION

The invention accordingly provides a process for increasing the molecular weight of polyacrylates, where polyacrylates functionalized at least on one part of their chain ends by photoinitiator groups X (also referred as functionalized groups below) are exposed to actinic radiation, so that a linking reaction of the polyacrylates takes place.

Here and below, the general term polyacrylates should also be understood to include their derivatives, and poly-methacrylates and their derivatives.

With particular advantage the reaction in question is a direct linking reaction, i.e., a linking reaction of the individual polyacrylate molecules with one another.

It is likewise very advantageous as well, however, if the irradiation with actinic radiation is conducted in the presence of at least one crosslinker substance, so that a linking reaction of the polyacrylates which includes the crosslinker substance takes place.

In the case of the polyacrylates the photoinitiator groups X are located on their chain ends and are therefore also referred to below as functional end groups.

Very advantageously the polyacrylates functionalized with the photoinitiator groups X have an average molecular weight (number average) of $M_n$ in the range from 2000 to 1 000 000 g/mol. Accordingly the process is particularly suitable for the synthesis or for the crosslinking of polyacrylate pressure sensitive adhesives.

By increasing the molecular weight is meant, in the sense of the process of the invention, in particular a crosslinking, but also, furthermore, the synthesis of higher molecular weight (longer-chain) molecules. The process therefore allows the synthesis of higher molecular weight compounds from the lower molecular weight components; in a version which is particularly preferred for the process of the invention the components (i.e., the polyacrylates containing photoinitiator group X and, where appropriate, the crosslinker substances) are linked linearly to one another.

In one preferred process version the polyacrylates used are composed of at least 50% by weight of acrylic and/or methacrylic acid derivatives of the following general formula:

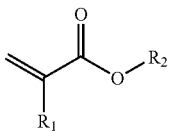

where $R_1$ is H or $CH_3$ and the radical $R_2$ is H or $CH_3$ or is selected from the group consisting of branched and unbranched saturated alkyl groups having 1 to 30, in particular 2 to 20 carbon atoms.

For polymerization the monomers are chosen such that the resulting polymers can be used for pressure sensitive adhesives at room temperature or higher temperatures, particularly such that the resulting polymers possess pressure sensitive adhesive properties in accordance with the "Handbook of Pressure Sensitive Adhesive Technology" by Donatas Satas (van Nostrand, N.Y., 1989).

In order to obtain a preferred polymer glass transition temperature $T_G \leq 25°$ C., in accordance with the above remarks, the monomers are very preferably selected in such a way, and the quantitative composition of the monomer mixture advantageously chosen in such a way, that the polymer is obtained with the desired $T_G$ in accordance with the Fox equation (G1) (cf. T. G. Fox, Bull. Am. Phys. Soc. 1 (1956) 123).

$$\frac{1}{T_G} = \sum_n \frac{w_n}{T_{G,n}} \quad (G1)$$

In this equation, n represents the serial number of the monomers used, $w_n$ denotes the mass fraction of the respective monomer n (in % by weight), and $T_{G,n}$ denotes the respective glass transition temperature of the homopolymer of the respective monomers n, in K.

Preferably, use is made of acrylates and methacrylates having alkyl groups of 4 to 14 carbon atoms, preferably of 4 to 9 carbon atoms. Specific examples, without wishing to be restricted by this listing, include methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as isobutyl acrylate, 2-ethylhexyl acrylate, 2-ethylhexyl methacrylate, isooctyl acrylate, and isooctyl methacrylate, for example.

Further classes of compounds which can be used include monofunctional acrylates and methacrylates of bridged cycloalkyl alcohols, composed of at least 6 carbon atoms. The cycloalkyl alcohols may also be substituted, by $C_{1-6}$ alkyl, halogen or cyano, for example. Specific examples include cyclohexyl methacrylates, isobornyl acrylate, isobornyl methacrylate, and 3,5-dimethyladamantyl acrylate.

Advantageously, monomers are used which carry polar groups such as carboxyl, sulfonic and phosphonic acid, hydroxyl, lactam and lactone, N-substituted amide, N-substituted amine, carbamate, epoxy, thioli ether, alkoxy, and cyano or the like.

Examples of moderate basic monomers are N,N-dialkyl-substituted amides, such as N,N-dimethylacrylamide, N,N-dimethylmethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxy-methyl)acrylamide, N-isopropylacrylamide, this list not being conclusive.

Further preferred examples are hydroxyethyl acrylate, hydroxypropyl acrylate, hydroxyethyl methacrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate, 6-hydroxyhexyl methacrylate, vinylacetic acid, tetrahydrofurfuryl acrylate, α-acryloyloxypropionic acid, trichloroacrylic acid, fumaric acid, crotonic acid, aconitic acid, dimethylacrylic acid.

In another very preferred process variant, comonomers used include vinyl esters, vinyl ethers, vinyl halides, vinylidene halides, and vinyl compounds with aromatic cycles and heterocycles in the a position. Here again, mention may be made nonexclusively of some examples: vinyl acetate, vinylformamide, vinylpyridine, ethyl vinyl ether, vinyl chloride, vinylidene chloride, and acrylonitrile.

Comonomers which possess a high static glass transition temperature are also preferably added to the monomers described. Suitable here are aromatic vinyl compounds, such as styrene, in which case the aromatic nuclei are preferably composed of $C_4$ to $C_{18}$ units and may also contain heteroatoms. Particularly preferred examples include 4-vinylpyridine, N-vinylphthalimide; methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of those monomers.

The polyacrylates have on at least one part of their chain end in each case one photoinitiator group X. The photoinitiator systems may be identical or else different photoinitiator systems within one molecule chain; furthermore, the photoinitiator systems of the individual polymer molecules can be chosen to be identical or different. Photoinitiators should here be taken to be compounds which under actinic radiation form at least one free radical.

As photoinitiators it is possible, for example, to use substances which absorb UV light. Some useful photoinitiators which are very good to use include benzoin ethers, such as benzoin methyl ether and benzoin isopropyl ether, for example, substituted acetophenones, such as 2,2-diethoxyacetophenone, 2,2-dimethoxy-2-phenyl-1-phenylethanone, dimethoxyhydroxyacetophenone, substituted α-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

The abovementioned photoinitiators X and others which can be used, including those of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, it is possible to consult Carroy et al. in "Chemistry and Technology of UV and EB Formulation for Coatings, Inks and Paints", Oldring (Ed.), 1994, SITA, London.

The abovementioned photoinitiators X may be attached at the respective end of the polymer chain by various means. Advantageously, the photoinitiator X is attached to the chain end by the polymerization process. In another advantageous procedure, the photoinitiator is attached selectively to the respective chain end by means of a polymer-analogous reaction. Also advantageously, the photoinitiator is generated on the respective chain end by a synthesis reaction.

Preferably, linear polyacrylates which each have one photoinitiator X on the respective chain end are used for crosslinking. However, it is also possible, advantageously, for the linear polyacrylates to exhibit branching along the polymer main chain, the side chains being able to be formed by the polymerization process; accordingly, with preference, the polyacrylates functionalized with photoinitiator groups may contain at least one chain branching site.

In one advantageous process version, two or more photoinitiators are attached in each case to one or more chain ends.

Moreover, in a further preferred procedure, specific branched polymers and star polymers are used. Advantageously, use is made of 3-arm, 4-arm, 6-arm, 8-arm or 12-arm star polymers based on poly(meth)acrylate. It is also possible to use hyperbranched polyacrylates. All polyacrylates carry at least one photoinitiator X on the respective chain end.

In order to prepare the polyacrylates, controlled or conventional free-radical polymerizations will be carried out. For the polymerizations proceeding by a radical mechanism it is preferred to use initiator systems which additionally comprise further radical initiators for the polymerization, especially thermally decomposing, radical-forming azo or peroxo initiators. In principle, however, any customary initiators that are familiar to the skilled worker for acrylates are suitable. The production of C-centered radicals is described in Houben Weyl, Methoden der Organischen Chemie, Vol. E 19a, pp. 60-147. These methods are employed preferentially in analogy.

Examples of radical sources are peroxides, hydroperoxides, and azo compounds; some nonexclusive examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. Preferably, 1,1'-azobis(cyclohexanecarbonitrile) (Vazo 88™ from DuPont) is used as radical initiator.

DETAILED DESCRIPTION

The average molecular weights (number average) $M_n$ of the pressure sensitive adhesives formed in the course of the controlled radical polymerization chosen such as to be situated within a range from 2 000 to 1 000 000 g/mol; specifically for further use as hotmelt pressure sensitive adhesives, PSAs having average molecular weights $M_n$ of from 100 000 to 500 000 g/mol are prepared. The average molecular weight is determined by size exclusion chromatography (gel permeation chromatography, SEC or GPC) or matrix-assisted laser desorption/ionization mass spectrometry (MALDI-MS).

The polymerization may be carried out in bulk, in the presence of one or more organic solvents, in the presence of water, or in mixtures of organic solvents and water. The aim is to minimize the amount of solvent used. Suitable organic solvents or solvent mixtures are pure alkanes (e.g., hexane, heptane, octane, isooctane), aromatic hydrocarbons (e.g., benzene, toluene, xylene), esters (e.g., ethyl, propyl, butyl or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. A water-miscible or hydrophilic cosolvent may be added to the aqueous polymerization reactions in order to ensure that in the course of monomer conversion the reaction mixture is in the form of a homogeneous phase. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones, and the like, and also derivatives and mixtures thereof.

The polymerization time is between 4 and 72 hours, depending on conversion and temperature. The higher the reaction temperature can be chosen, i.e., the higher the thermal stability of the reaction mixture, the lower the reaction time that can be chosen.

For the initiators which undergo thermal decomposition, the introduction of heat is essential to initiate the polymerization. For the thermally decomposing initiators the polymerization can be initiated by heating at from 50 to 160° C., depending on initiator type.

For the preparation of polyacrylates it may also be of advantage to prepare the polymers in bulk, i.e., without solvent. In this case, a particularly suitable techique is that of prepolymerization. The polymerization is initiated with UV light but conducted only to a low conversion of about 10-30%. The resulting polymer syrup can then be welded, for example, into films (in the simplest case, ice cubes) and then polymerized in water to a high conversion. The resulting pellets can then be used as acrylic hotmelt adhesives, in which case the film materials used for the melting operation are with particular preference materials compatible with the poly(meth)acrylate.

Another possibly advantageous preparation process for the polyacrylates is anionic polymerization. In this case it is preferred to use inert solvents as the reaction medium, such as aliphatic and cycloaliphatic hydrocarbons, for example, or else aromatic hydrocarbons.

In this case the living polymer is generally represented by the structure $P_L(A)$-Me, in which Me is a metal from group 1, such as lithium, sodium or potassium, and $P_L(A)$ is a growing polymer block of the monomers A. The molar mass of the endgroup-modified poly(meth)acrylate to be prepared is controlled by the ratio of initiator concentration to monomer concentration. For the synthesis of the polymer it is preferred to use acrylate and methacrylate monomers which do not adversely affect, let alone cause complete termination of, the anionic polymerization process.

For the preparation of polyacrylates terminally functionalized with X end photoinitiator groups, it may be of an advantage to add monomers for the synthesis of a polymer block and then, by adding a second monomer, to attach a further polymer block containing the group X. Alternatively, a suitable difunctional compound can be coupled. In this way it is also possible to obtain starblock copolymers $(P(B)-P(A))_n$. In these cases, however, the anionic initiator ought already to carry the functional group X, or the group ought to be obtainable by a subsequent polymer-analogous reaction.

For general anionic polymerizations, examples of suitable polymerization initiators include n-propyllithium, n-butyllithium, sec-butyllithium, 2-naphthyllithium, cyclohexyllithium, and octyllithium, with this list making no claim to completeness. Furthermore, initiators based on samarium complexes are known for the polymerization of acrylates (Macromolecules, 1995, 28, 7886) and can be used here. With these initiators, however, it must be borne in mind that only mono-endgroup-functional polyacrylates can be obtained by this route, by terminating the corresponding anionic polymerization. For the preparation of carboxyl groups this can take place, for example, by means of $CO_2$ with subsequent hydrolysis; for the preparation of hydroxyl groups, for example, by reaction with ethylene oxide and subsequent hydrolysis. Functionalization by X is then performed by means of a polymer-analogous reaction with the hydroxyl group.

For the synthesis of the polyacrylates it is possible to use nitroxide-controlled polymerization processes. For the preferred difunctional polyacrylates it is preferred to use difunctional initiators. One example of this is difunctional alkoxyamines

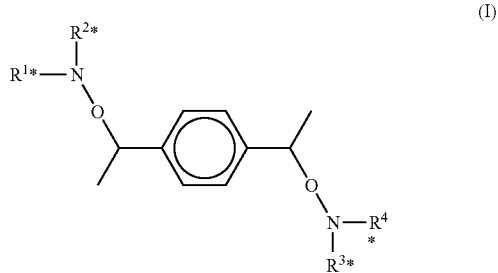

(I)

where $R^{1*}$, $R^{2*}$, $R^{3*}$, and $R^{4*}$ may be different, identical or chemically joined to one another and where the pairs $R^{1*}$ and $R^{2*}$ and also $R^{3*}$ and $R^{4*}$ in each case contain at least one group X or possess a functional group which can be converted into X by chemical reaction. $R^1$ to $R^4$ are preferably, independently of each other, chosen as:

i) halides, such as chlorine, bromine or iodine, for example,
ii) linear, branched, cyclic and heterocyclic hydrocarbons having from 1 to 20 carbon atoms, which may be saturated, unsaturated or aromatic,
iii) esters —$COOR^{5*}$, alkoxides —$OR^{6*}$ and/or phosphonates —$PO(OR^{7*})_2$, where $R^5$, $R^{6\prime}$, and $R^7$ stand for radicals from group ii),
iv) radicals from ii) where additionally at least one hydroxy function or silyl ether function is present.

For the preparation of the terminally functionalized polyacrylates by nitroxide-controlled polymerization it is also possible to use further, different alkoxyamines. From the basic synthesis design, the middle block, which following thermal initiation, initiation by thermal radiation or actinic radiation, forms two free radicals, can be additionally varied or modified further. The skilled worker is aware of a variety of chemical structures. The precondition is that at least two free radicals are formed which are stabilized by nitroxides which carry at least one functional group X or a group which is converted into X by means of a chemical reaction.

In one favorable procedure, nitroxides of type (II) or (III) are used for radical stabilization:

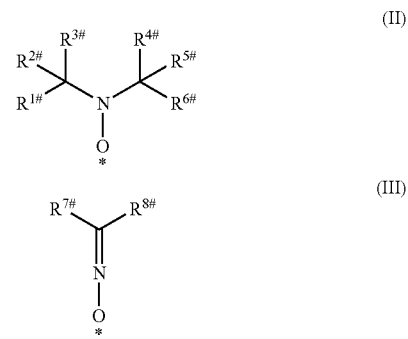

where $R^{1\#}$, $R^{2\#}$, $R^{3\#}$, $R^{4\#}$, $R^{5\#}$, $R^{6\#}$, $R^{7\#}$; and $R^{8*}$ independently of one another denote the following compounds or atoms and preferably at least one of the radicals $R^{1\#}$ to $R^{6\#}$ or $R^{7\#}$ and/or $R^{8\#}$ carry at least one group X or contain a group which can be converted into the desired group X by means of a chemical reaction. $R^{1\#}$ to $R^{8\#}$ are preferably, independently of each other, chosen as:

i) halides, such as chlorine, bromine or iodine, for example,
ii) linear, branched, cyclic and heterocyclic hydrocarbons having from 1 to 20 carbon atoms, which may be saturated, unsaturated or aromatic,
iii) esters —$COOR^{9\#}$, alkoxides —$OR^{10\#}$ and/or phosphonates —$PO(OR^{11\#})_2$, where $R^{9\#}$, $R^{10\#}$, and $R^{11\#}$ stand for radicals from group ii),
iv) radicals from the group ii) where additionally at least one hydroxy function or silyl ether function is present.

Compounds of the above type (II) or (III) may also be attached to polymer chains of any kind (primarily such that at least one of the abovementioned radicals constitutes a polymer chain of this kind) and may therefore be utilized, for example, for the synthesis of end-functionalized polymers, as macroradicals or macroregulators.

Further general nitroxide-controlled processes for implementing controlled free-radical polymerizations are described below. U.S. Pat. No. 4,581,429 A discloses a controlled-growth radical polymerization process which uses as its initiator a compound of the formula R'R"N—O—Y, in which Y denotes a free radical species which is able to polymerize unsaturated monomers. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, are used. WO 98/44008 A1 discloses specific nitroxyls based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides improve the efficiency for the preparation of polyacrylates (Hawker, contribution to the National Meeting of The American Chemical Society, Spring 1997; Husemann, contribution to the IUPAC World Polymer Meeting 1998, Gold Coast).

All of the abovementioned processes can be employed, by introducing one or more functional groups X on the stabilizing nitroxide radical and/or on the polymerization-initiating radical, for preparing endgroup-functionalized polyacrylates.

A very preferred preparation process conducted is a variant of the RAFT polymerization (reversible addition-fragmentation chain transfer polymerization). The polymerization process is described in detail, for example, in the documents WO 98/01478 A1 and WO 99/31144 A1. Suitable with particular advantage for the preparation of terminally functionalized polyacrylates are trithiocarbonates of the general structure R'''—S—C(S)—S—R''' (Macromolecules 2000, 33, 243-245), by means of which one or more monomers (acrylates/methacrylates) are polymerized and portions of the regulator remain as endgroups in the polymer. In the simplest case, therefore, the trithiocarbonate may consist of one compound, where R''' contains a functional group X or a functional group which can be converted into a functional group X by means of a chemical reaction.

It may further be appropriate to carry out a two-stage polymerization. In a first step, monomers containing at least one functional group X are polymerized using a trithiocarbonate and then used in a second step to polymerize the (meth)acrylates. The polymerization may take place continuously or with termination after the first stage, and subsequent reinitiation.

The latter method is particularly suitable for preparing terminally functionalized polyacrylates containing two or more functional groups X at each end.

Advantageously, use is made, for example, of the trithiocarbonates (IV) and (V) for the polymerization, with φ possibly being a phenyl ring, which is unfunctionalized or may be functionalized by alkyl or aryl substituents linked directly or via ester or ether bridges, or a cyano group.

In order to promote the polymerization, the control, and the rate of polymerization it may be of advantage to use substituted compounds. Examples of possible functionalizations include halogens, hydroxyl groups, epoxy groups, groups containing nitrogen or groups containing sulfur, although this list makes no claim to completeness. Some of these groups may in turn be used as functional groups X.

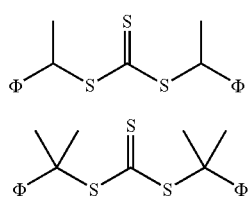
(IV)

(V)

Besides trithiocarbonates, however, it is also possible to use the following structural units for the controlled polymerization, with k being defined as below:

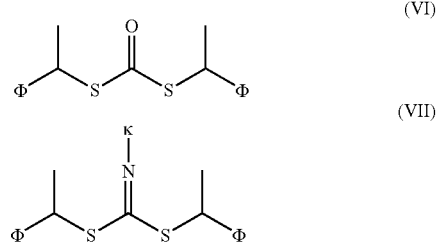
(VI)

(VII)

In order to prepare terminally functionalized polyacrylates with few groups X or only one group X, on the other hand, it may be an advantage to use terminally functionalized trithiocarbonates. Particularly preferably, use is made, for example, of trithiocarbonates of type VIII and IX.

(VIII)

(IX)

(X)

(XI)

The group X ought not to influence the controlled free-radical polymerization. Moreover, the group k is highly variable, in order to improve the control of the polymerization or to change the polymerization rate. k can be $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic and aromatic heterocycles. Furthermore, k can contain one or more groups —$NH_2$, —NH—$R^{VI}$, —$NR^{VI}R^{VII}$, —NH—C(O)—$R^{VI}$, —$NR^{VI}$—C(O)—R $^{VII}$, —NH—C(S)—$R^{VI}$, —$NR^{VI}$—C(S)—$R^{VII}$,

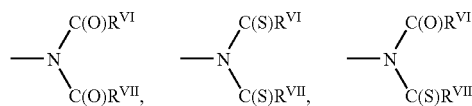

where $R^{VI}$ and $R^{VII}$ can in turn be compounds of the type $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic and aromatic heterocycles, and are independent of one another or the same.

It is, however, also possible to use regulators which carry functionalized dithioester groups at the end and which incorporate these groups at the end of the polymer. Regulators of this kind can in the simplest case have the structure XII.

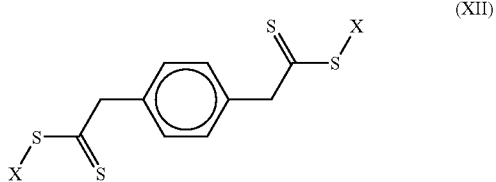

In this case, however, the functional group ought not to influence the polymerization process but should instead remain on the sulfur atoms, so that this group is incorporated at the end of the polymer chain. Furthermore, the dibenzylic group can be further modified and adapted in order further to improve the polymerization properties. At this point mention may be made, merely by way of example, of patents WO 98/01478 A1 and WO 99/31144 A1.

As a further controlled polymerization method, atom transfer radical polymerization (ATRP) can be used advantageously to synthesize the block copolymers, in which case use is made preferably, as initiator, of monofunctional or difunctional secondary or tertiary halides and, for abstracting the halide(s), of complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. No. 5,945,491 A, U.S. Pat. No. 5,854,364 A, and U.S. Pat. No. 5,789,487 A. For the preparation of the terminally functionalized polyacrylates, the corresponding secondary or tertiary halide ought already to carry the desired functional group X. Moreover, as a result of the polymerization process, halides remain as endgroups in the polymer, and may likewise be converted into the corresponding functional groups X by means of substitution reactions. In order to produce multiblock or star-shaped structures it is possible to proceed in accordance with the design described in Macromolecules 1999, 32, 231-234. There, polyfunctional halides are used for the polymerization, and must then be reacted further in a substitution reaction by polymer-analogous means to give the desired functional group(s) X.

In order to produce multiarm, star-shaped or dendritic temrinaly functionalized polyacrylates endgroup-functionalized with X it is likewise possible to employ the polymerization processes described above. Through modification of the initiating compound or of the regulator, such compounds are readily available. The following structures show examples of suitable compounds, the compound XIII being a suitable substance for preparing a 12-arm polyacrylate by an ATRP technique, the compound XIV being suitable for preparing a 6-arm polyacrylate by a RAFT technique, and the compound XV being suitable for preparing a 3-arm polyacrylate via nitroxide-controlled reaction.

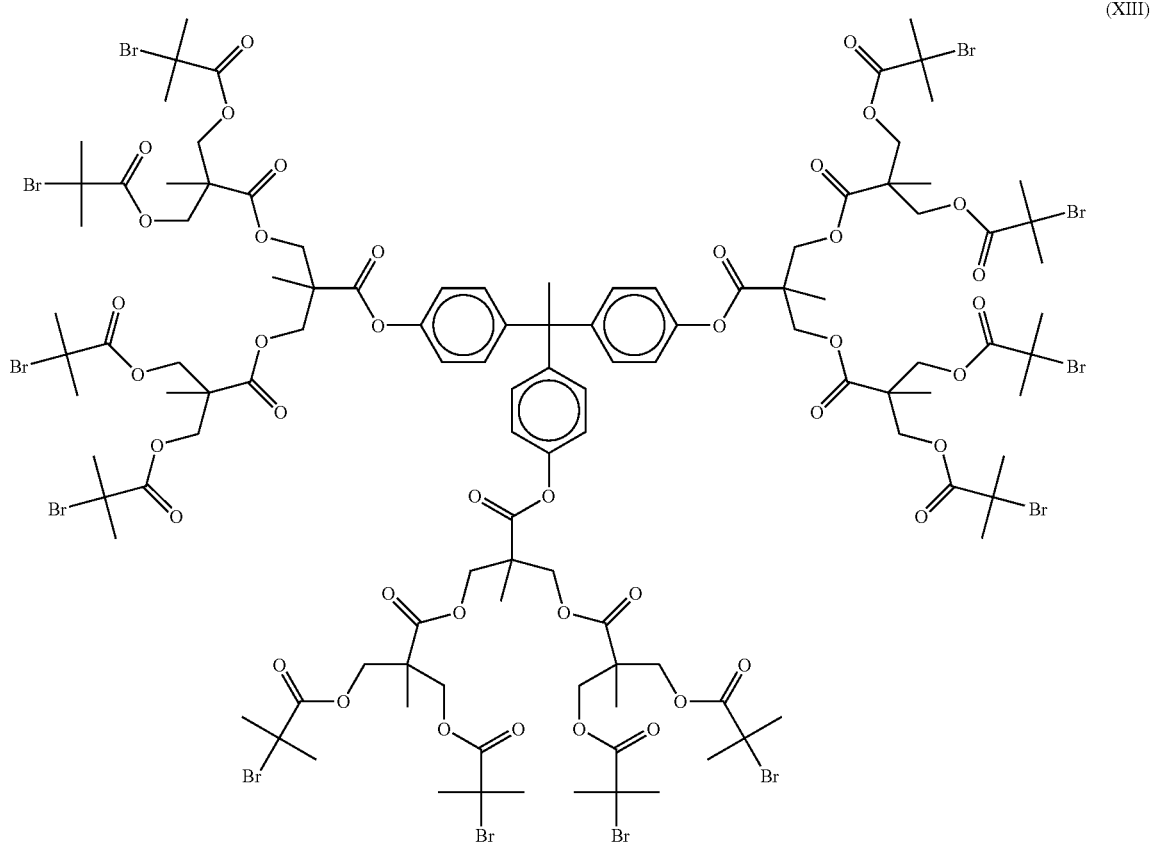

-continued

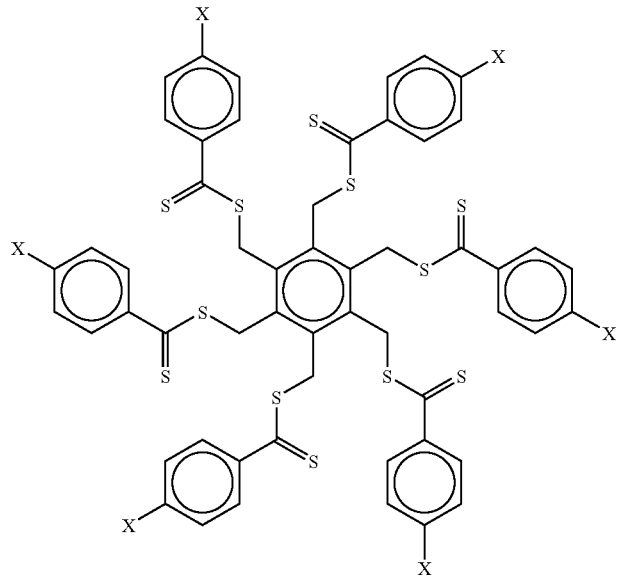
(XIV)

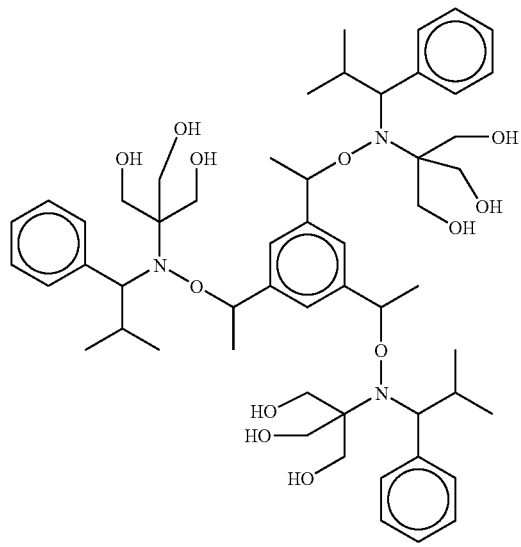
(XV)

The abovementioned examples are intended only to be exemplary in nature. Polyacrylates prepared from compound XIii can be converted, for example, by reaction (substitution reaction) of the terminal bromides into suitable endgroup-functionalized polyacrylates. Polyacrylates prepared from compound XIV already possess one functional group X per polymer arm as endgroup. The regulator XIV may, however, also carry this functional group at another position on the terminal phenyl rings or else may carry two or more functional groups on the terminal phenyl rings. Polyacrylates prepared from compound XV already possesses 3-hydroxyl groups per polymer arm as terminal functional groups, which can be used for the generation of X.

The number of arms produced can be controlled by the number of the groups which are essential for the controlled free-radical polymerization. Moreover, it is also possible to exchange, modify or targetedly substitute functional groups. By means of this measure it is possible, for example, to increase or lower the control or the rate of polymerization.

Furthermore, all of the abovementioned polymerization methods depict only exemplary compounds for preparing polyacrylates terminally functionalized with photoinitiator groups X. It is also possible, however, to employ all of the methods of controlled polymerization that are familiar to the skilled worker, provided these polymerization methods allow the introduction of functional groups X at the polymer end.

Besides the controlled radical methods, further free-radical polymerization methods are also suitable for introducing functional groups. By way of example mention may be made merely of thiol-regulated compounds, in which case the thiols or dithio compounds may likewise carry functional groups X and thus effect terminal functionalization of polyacrylates. Furthermore, functional groups can be introduced into the polymer as endgroups by means of the initiator. There exist, for example, commercial azo initiators, which carry free carboxylic acid groups or hydroxyl groups, which then, likewise by way of the polymerization, can be installed in the polymer at the ends and utilized for the coupling reaction. Another possibility would be to scavenge the free radical polymerization and in that way incorporate a functional group X.

For further development, resins may be admixed to the polyacrylates. As tackifying resins for addition it is possible without exception to use any tackifier resins which are known and are described in the literature. As representatives, mention may be made of pinene resins, indene resins, and rosins, their disproportionated, hydrogenated, polymerized, esterified derivatives and salts, the aliphatic and aromatic hydrocarbon resins, terpene resins and terpene-phenolic resins, and also C5, C9, and other hydrocarbon resins. Any desired combinations of these and other resins may be used in order to adjust the properties of the resulting adhesive in accordance with what is desired. In general it is possible to use any resin which is compatible (soluble) with the corresponding polyacrylate; in particular, reference may be made to all aliphatic, aromatic, and alkylaromatic hydrocarbon resins, hydrocarbon resins based on pure monomers, hydrogenated hydrocarbon resins, functional hydrocarbon resins, and natural resins. Express reference is made to the depiction of the state of the art in the "Handbook of Pressure Sensitive Adhesive Technology" by Donatas Satas (van Nostrand, 1989).

Furthermore, it is also possible optionally to add plasticizers, fillers (e.g., fibers, carbon black, zinc oxide, titanium dioxide, chalk, solid or hollow glass beads, microbeads made of other materials, silica, silicates), nucleators, blowing agents, compounding agents and/or aging inhibitors, in the form for example of primary and secondary antioxidants or in the form of light stabilizers.

In order to produce hotmelt poly(meth)acrylate PSAs, the polymers described above are preferably coated as hotmelt systems. For the production process it may therefore be necessary to remove the solvent from the PSA. In principle it is possible here to use any of the techniques known to the skilled worker. One very preferred technique is that of concentration using a single-screw or twin-screw extruder. The twin-screw extruder may be operated corotatingly or counterrotatingly. The solvent or water is distilled off preferably by way of several vacuum stages. Moreover, counterheating is carried out depending on the distillation temperature of the solvent. The residual solvent fractions are preferably <1%, more preferably <0.5% and very preferably <0.2%. The hotmelt is processed further from the melt.

In one very preferred procedure, the crosslinking reaction is promoted by adding vinyl compounds with a functionality of at least two. In one further very preferred procedure, for example, trifunctional vinyl compounds are added. An example of the crosslinking principle is depicted in the following diagram:

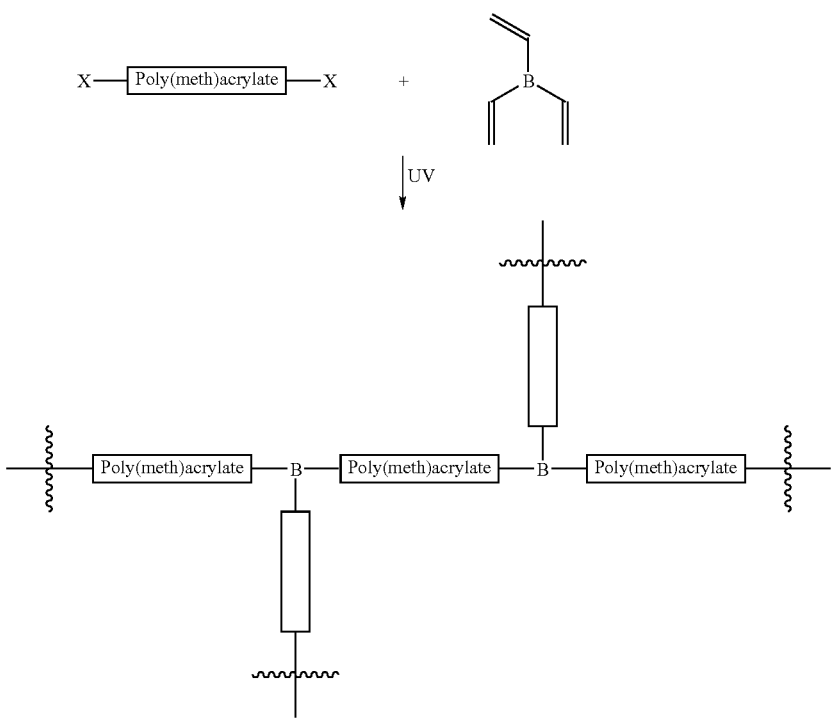

where B, as a linking unit, can be an organic compound, an oligomer or a polymer.

Preferably, the component to be added is an organic compound containing at least two unsaturated groups. For increasing the rate of crosslinking further, difunctional or polyfunctional methacrylates are preferred to difunctional or polyfunctional terminal vinyl compounds. Very preferably, difunctional or polyfunctional acrylates are used for the coupling reaction.

Besides the low molecular mass organic compounds, it is also possible to use higher molecular mass compounds (oligomers) or polymers as crosslinker substances with at least 2 vinyl compounds. The polymer group may embrace, for example, polyacrylates, polymethacrylates, polyisobutene, polyethylene, polypropylene, polyvinyl acetate, polyurethane, polyvinyl chloride, polystyrene, polycaprolactam, polycaprolactone, polyesters, polybenzoates, polysiloxanes, polyethylene/propylene copolymers, polybutadiene, polyisoprene, polybutene, polythiophene, polyacetylene, polyanthracene, polysilanes, polyamides, polycarbonates, polyvinyl alcohol, polypropylene oxide, polyethylene oxide, polyphenylene, polychloroprenes, and fluorinated polymers.

Furthermore, it is also possible in principle to add further, unattached, UV-absorbing photoinitiators. Useful photoinitiators which are very good to use include benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

The abovementioned photoinitiators and others which can be used, including those of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, it is possible to consult Carroy et al. in "Chemistry and Technology of UV and EB Formulation for Coatings, Inks and Paints", Oldring (Ed.), 1994, SITA, London.

For the very preferred use of the polyacrylates terminally functionalized with photoinitiator groups X, they are coated either from solution or from the melt onto a carrier material.

Carrier materials used in the case of use as a pressure sensitive adhesive, for PSA tapes, for example, are the materials which are customary and familiar to the skilled worker, such as films (polyesters, PET, PE, PP, BOPP, PVC), nonwovens, foams, wovens, and woven sheets, and also release paper (glassine, HDPE, LDPE). This list is not conclusive.

UV crosslinking is effected by brief irradiation with ultraviolet radiation in a wavelength range from 200 to 400 nm, depending on the UV photoinitiator X used, especially using high or medium pressure mercury lamps with an output of from 80 to 240 W/cm. The irradiation intensity is adapted to the respective quantum yield of the UV photoinitiator and the degree of crosslinking to be brought about.

A further option is to crosslink the applied polyacrylates, terminally functionalized with photoinitiator groups X, with electron beams. Typical irradiation equipment which may be used includes linear cathode systems, scanner systems, and segmented cathode systems, where electron beam accelerators are concerned. A detailed description of the state of the art, and the most important process parameters, can be found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably between 80 kV and 300 kV. The scatter doses employed range between 5 and 150 kGy, in particular between 20 and 100 kGy.

Besides the inventive process for coupling and crosslinking polyacrylates, part of this invention is the use of such systems for pressure sensitive adhesive tapes, in particular for single-sided or double-sided PSA tapes.

Depending on polymer composition, the polymers composed or crosslinked as described above and the processes for crosslinking them may also be utilized for films or release coating materials, Highly halogenated polymers could also be used, for example, as flame retardants. Moreover, it is also possible to use the inventive process to prepare heat-activatable PSAs. For this application, the polyacrylate terminally functionalized with photoinitiator groups X ought to possess a glass transition temperature of more than 25° C. For the polymers of the invention with a close polymer network, applications in the coatings field are also possible. Polymers having a high glass transition temperature, prepared by the inventive process, may likewise be employed as thermoplastics.

TEST METHODS

A. Shear Stability Times

The test took place in accordance with PSTC-7. A 50 μm thick pressure sensitive adhesive layer is applied to a 25 μm thick PET film. A strip of this sample 1.3 cm wide is bonded to a polished steel plate over a length of 2 cm, by rolling over it back and forth three times using a 2 kg roller. The plates are equilibrated for 30 minutes under test conditions (temperature and humidity) but without loading. Then the test weight is hung on, exerting a shearing stress parallel to the bond surface, and the time taken for the bond to fail is measured. If a holding time of 10 000 minutes is reached, the test is terminated before the adhesive bond fails.

B. Bond Strength

The testing of the peel adhesion (bond strength) took place in accordance with PSTC-1. A 50 μm thick pressure sensitive adhesive layer is applied to a 25 μm thick PET film. A strip of this sample 2 cm wide is bonded to a steel plate by rolling back and forth over it three times using a 2 kg roller. The steel plate is clamped in and the self-adhesive strip is pulled off from its free end at a peel angle of 180° using a tensile testing machine.

C. Gel Permeation Chromatography GPC

The average molecular weight $M_w$ and the polydispersity PD were determined by the company Polymer Standards Service of Mainz, Germany. The eluent used was THF containing 0.1% by volume trifluoroacetic acid. Measurement was made at 25° C. The precolumn used was PSS-SDV, 5μ, $10^3$ Å, ID 8.0 mm×50 mm. Separation was carried out using the columns PSS-SDV, 5μ, $10^3$ and also $10^5$ and $10^6$ each of ID 8.0 mm×300 mm. The sample concentration was 4 g/l and the flow rate 1.0 ml per minute. Measurement was made against PMMA standards.

D. Gel Fraction

The carefully dried, solvent-free adhesive samples are welded into a pouch of polyethylene nonwoven (Tyvek nonwoven). The gel index, i.e., the toluene-insoluble weight fraction of the polymer, is determined from the difference in the sample weights before and after extraction with toluene.

Amine-Functionalized UV Photoinitiator:

3-[4-(Dimethylamino)phenyl]-1-[4-(2-hydroxy-ethoxy)phenyl]-2-propen-1-one (XVI):

A mixture of 15 g of 2-bromoethanol, 16.3 g of p-hydroxyacetophenone and 5.3 g of sodium hydroxide in 100 ml of dimethylformamide (DMF) was heated at 150° C. for 15 hours. The mixture was then poured into water and the product was extracted with dichloromethane. Subsequent vacuum distillation gave 11.4 g of a white solid (4-(2-hydroxyethoxy)acetophenone).

In a second reaction, a mixture of 8.3 g of p-dimethylaminobenzaldehyde, 10.0 g of 4-(2-hydroxyethoxy)acetophenone and 2.5 g of sodium hydroxide in 100 ml of methanol was heated at reflux for 10 hours. The reaction mixture was then cooled using an ice bath and filtered and the solid isolated by filtration was washed with cold methanol. The product was then dried in a vacuum drying cabinet at 40° C. and 10 torr. 10.2 g of white solid were isolated. The melting point was 128° C. (cf. U.S. Pat. No. 4,565,769, m.p.: 127-128.5° C.)

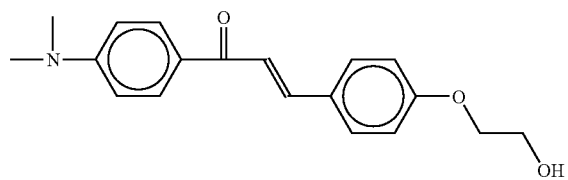

(XVI)

Preparation of a RAFT Regulator:

The regulator bis-2,2'-phenylethyl trithiocarbonate was prepared starting from 2-phenylethyl bromide using carbon disulfide and sodium hydroxide in accordance with the set of instructions in Synth. Comm., 1988, 18 (13), 1531. Yield: 72%. $^1$H-NMR (CDCl$_3$), δ: 7.20-7.40 ppm (m, 10H); 3.81 ppm (m, 1H); 3.71 ppm (m, 1H); 1.59 ppm (d, 3H); 1.53 ppm (d, 3H).

EXAMPLE 1

A 2 L glass reactor conventional for free-radical polymerizations was charged with 40 g of benzoin acrylate, 0.4 g of bis-2,2'-phenylethyl trithiocarbonate and 100 g of acetone/isopropanol (95/5). The batch was rendered inert with nitrogen gas while being stirred with an anchor stirrer at room temperature for 1 hour. It was then heated to an internal temperature of 58° C. using an oil bath, after which 0.2 g of Vazo 64™ (from DuPont) (2,2'-azobis(isobutyronitrile)) in solution in 5 g of acetone was added. After a polymerization time of 24 hours, the batch was cooled to room temperature and acetone was distilled off on a rotary evaporator. Analysis by GPC (test C, PMMA standards) gave a molecular weight of $M_w$ of 3 250 g/mol and $M_w$ of 7 980 g/mol.

Subsequently this oligomeric polyacrylate, 300 g of 2-ethylhexyl acrylate and 60 g of acrylic acid were dissolved in 150 g of acetone and the solution was rendered inert using nitrogen gas for 1 hour and then heated to an internal temperature of 58° C. again. At this temperature, 0.2 g of Vazo 64™ (DuPont) (2,2'-azobis(isobutyronitrile)) in solution in 5 g of acetone was added. The polymerization was conducted at a constant external temperature of 70° C. Following a reaction time of 6 hours, the batch was diluted with 100 g of acetone. After a reaction time of 24 hours, a further 0.2 g of Vazo 64™ (DuPont) (2,2'-azobis(isobutyronitrile)) in solution in 5 g of acetone was added. After 30 hours the batch was diluted with 50 g of acetone. The polymerization was terminated by cooling to room temperature after a reaction time of 48 hours. Analysis by GPC (test C, PMMA standards) gave a molecular weight $M_n$ of 146 000 g/mol and $M_w$ of 356 000 g/mol.

Thereafter the solvent was removed in a drying cabinet at 60° C. under a vacuum of 10 torr. After that, 1% by weight of pentaerythritol triacrylate was mixed into the melt and the composition was applied from the melt at 150° C. to a primed PET film 23 μm thick. The application rate was 50 g/m². In order to activate the coupling reaction the PSA specimen was irradiated in a number of passes with a medium pressure mercury lamp (120 W/cm) from Eltosch with a belt speed of 20 m/min. The technical adhesive properties were tested by carrying out test methods A and B.

EXAMPLE 2

A 2 L glass reactor conventional for free-radical polymerizations was charged with 40 g of acrylic acid, 0.4 g of bis-2,2'-phenylethyl trithiocarbonate and 160 g of DMF. The batch was rendered inert with nitrogen gas while being stirred with an anchor stirrer at room temperature for 1 hour. It was then heated to an internal temperature of 58° C. using an oil bath, after which 0.2 g of Vazo 64™ (from DuPont) (2,2'-azobis(isobutyronitrile)) in solution in 5 g of DMF was added. After a polymerization time of 24 hours, the batch was cooled to room temperature and DMF was distilled off on a rotary evaporator. Analysis by GPC (test C, PMMA standards) gave a molecular weight of Mn of 2 820 g/mol and $M_w$ of 7 540 g/mol.

Subsequently this oligomeric polyacrylate, 300 g of 2-ethylhexyl acrylate and 60 g of methyl acrylate were dissolved in 150 g of acetone/n-butanol (7:3) and the solution was rendered inert using nitrogen gas for 1 hour and then heated to an internal temperature of 58° C. again. At this temperature, 0.2 g of Vazo 64™ (DuPont) (2,2'-azobis-(isobutyronitrile)) in solution in 5 g of acetone was added. The polymerization was conducted at a constant external temperature of 70° C. Following a reaction time of 6 hours, the batch was diluted with 80 g of acetone. After a reaction time of 24 hours, a further 0.2 g of Vazo 64™ (DuPont) (2,2'-azobis(isobutyronitrile)) in solution in 5 g of acetone was added. After 30 hours the batch was diluted with 50 g of acetone. The polymerization was terminated by cooling to room temperature after a reaction time of 48 hours. Analysis by GPC (test C, PMMA standards) gave a molecular weight Mn of 166 000 g/mol and $M_w$ of 421 000 g/mol.

The resulting polymer was then concentrated in the presence of 0.5% by weight of 3-[4-(dimethylamino)phenyl]-1-[4-(2-hydroxyethoxy)phenyl]-2-propen-1-one, again based on the polymer. Thereafter the solvent was removed in a drying cabinet at 60° C. under a vacuum of 10 torr. After that, 1% by weight of pentaerythritol triacrylate was added in a hotmelt process (see above) and the composition was applied from the melt at 140° C. to a primed PET film 23 μm thick. The application rate was 50 g/m². In order to activate the coupling reaction the PSA specimen was irradiated in a number of passes with a medium pressure mercury lamp (120 W/cm) from Eltosch with a belt speed of 20 m/min. The technical adhesive properties were tested by carrying out test methods A and B.

RESULTS

In example 1, using a trithiocarbonate regulator, a polyacrylate was prepared with a plurality of benzoin units at the respective polymer chain end. The polymer was subsequently freed from the solvent, mixed with a polyfunctional acrylate, and coated from the melt. After the coating operation, the composition was UV-irradiated using a medium pressure mercury lamp and was crosslinked directly on the carrier.

In example 2, a polymer provided with UV photoinitiators was coated from the melt and then UV-crosslinked. The polymer was reacted with an amine-functionalized UV photo-initiator in a polymer-analogous reaction. The reaction led likewise to a polyacrylate containing a plurality of photoinitiator molecules, attached to the polymer chain end. This polymer was blended with a polyfunctional acrylate and, following coating from the melt was UV-crosslinked on the carrier.

The table below summarizes the technical adhesive data, including the data for the case of actinic radiation where appropriate. From the table, however, it is very clearly evident that the process of the invention is highly suitable for preparing pressure sensitive adhesives.

| Material | UV dose [mJ/cm$^2$] | Gel fraction [%] | SST 23° C., 10 N [min] | BS steel [N/cm] |
|---|---|---|---|---|
| Example 1 | UV-C: 100 UV-B: 560 | 59 | 4 780 | 3.7 |
| Example 1 | UV-C: 150 UV-B: 840 | 70 | 8 725 | 3.5 |
| Example 2 | UV-C: 100 UV-B: 560 | 52 | 1 420 | 4.2 |
| Example 2 | UV-C: 150 UV-B: 840 | 65 | 1 810 | 4.0 |

Application rate: 50 g/m$^2$
BS: immediate bond strength on steel
SST: shear stability times
UV dose: measured with the Power-Puck ™ from Eltosch

We claim:

1. A process for increasing the molecular weight of polyacrylates, wherein polyacrylates which are functionalized at least on one part of their chain ends by photoinitiator groups X are exposed to actinic radiation, so that a direct linking reaction of the polyacrylates takes place.

2. A process for increasing the molecular weight of polyacrylates, wherein polyacrylates which are functionalized at least on one part of their chain ends by suitable photoinitiator groups X are exposed to actinic radiation in the presence of at least one crosslinker substance, so that a linking reaction of the polyacrylates which includes the crosslinker substance takes place.

3. A process according to claim 1 or 2, wherein the polyacrylates functionalized with photoinitiator groups have an average molecular weight (number average) $M_n$ in the range from 2 000 to 1 000 000 g/mol.

4. A process according to claim 1 or 2, wherein the photoinitiator groups are those of UV photoinitiators of the Norrish I and/or Norrish II type.

5. A process according to claim 1 or 2, wherein the increase in the molecular weight comprises a crosslinking reaction.

6. A process as claimed in claim 1 or 2, wherein the linking reactions link the polyacrylate molecules linearly to one another.

7. A process as claimed in claim 1 or 2, wherein the polyacrylates functionalized with photoinitiator groups contain at least one chain branching site.

8. A process as claimed in claim 7, wherein the polyacrylates have at least three photoinitiator groups.

9. A process as claimed in claim 1 or 2, wherein at least one difunctional or polyfunctional vinyl compound is added to the polyacrylate functionalized with photoinitiator groups.

10. A pressure sensitive adhesive for single-sided and double-sided pressure sensitive adhesive tapes comprising at least one Polyacrylate prepared by the process of claim 1 or 2.

11. A process according to claim 9, wherein said vinyl compound is a methacrylate-based compound.

12. A process according to claim 9, wherein said vinyl compound is an acrylate-based compound.

* * * * *